United States Patent
Buckley et al.

(10) Patent No.: US 8,972,814 B2
(45) Date of Patent: *Mar. 3, 2015

(54) MESSAGE REARRANGEMENT FOR IMPROVED WIRELESS CODE PERFORMANCE

(71) Applicant: BlackBerry Limited, Waterloo (CA)

(72) Inventors: Michael Eoin Buckley, Grayslake, IL (US); Sean Bartholomew Simmons, Waterloo (CA); Youn Hyoung Heo, Gyunggi-do (KR); Mo-Han Fong, Sunnyvale, CA (US); Masoud Ebrahimi Tazeh Mahalleh, Ottawa (CA); Zhijun Cai, Euless, TX (US); Andrew Mark Earnshaw, Kanata (CA); Nathaniel Joseph Karst, Somerville, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,344

(22) Filed: Apr. 30, 2014

(65) Prior Publication Data

US 2014/0233534 A1 Aug. 21, 2014

Related U.S. Application Data

(63) Continuation of application No. 13/268,255, filed on Oct. 7, 2011, now Pat. No. 8,769,365, which is a continuation of application No. PCT/US2010/052075, filed on Oct. 8, 2010.

(51) Int. Cl.
*H04L 1/18* (2006.01)
*H04J 13/16* (2011.01)
(Continued)

(52) U.S. Cl.
CPC .............. *H04J 13/16* (2013.01); *H04L 1/0026* (2013.01); *H04L 1/0031* (2013.01);
(Continued)

(58) Field of Classification Search
CPC ... H04L 1/0026; H04L 1/1812; H04L 5/0055; H04L 1/18
USPC .................................. 714/701, 748–759, 786
See application file for complete search history.

(56) References Cited

U.S. PATENT DOCUMENTS

| | | | |
|---|---|---|---|
| 5,127,013 A | 6/1992 | Yoshida | |
| 6,445,476 B1 | 9/2002 | Kahn et al. | |

(Continued)

FOREIGN PATENT DOCUMENTS

| | | | |
|---|---|---|---|
| EP | 1098445 A1 | 5/2001 | |
| EP | 1811711 A1 | 7/2007 | |
| EP | 1895666 A1 | 3/2008 | |
| WO | 9740582 A1 | 10/1997 | |
| WO | 0141314 A1 | 6/2001 | |
| WO | 2009134913 A1 | 11/2009 | |

OTHER PUBLICATIONS

Buckley, Michael Eoin, et al.; U.S. Appl. No. 13/268,255, filed Oct. 7, 2011; Title: Message Rearrangement For Improved Wireless Code Performance.

(Continued)

*Primary Examiner* — Shelly A Chase
(74) *Attorney, Agent, or Firm* — Conley Rose, P.C.; J. Robert Brown, Jr.

(57) ABSTRACT

A system and method for permuting known and unknown message bits before encoding to provide a beneficial rearrangement of bits. Such a method can improve distance properties in the resulting subcode. In various embodiments, the structure of a beneficial rearrangement is dependent on the parameters of how known and unknown bits are grouped and on the specific type of code being used. Given these two parameters, the message bits can be rearranged to more efficiently leverage any apriori knowledge.

23 Claims, 6 Drawing Sheets

(51) Int. Cl.
| | |
|---|---|
| H04L 1/00 | (2006.01) |
| H04L 1/16 | (2006.01) |
| H04L 5/00 | (2006.01) |
| H04L 1/12 | (2006.01) |

(52) U.S. Cl.
CPC ........... *H04L 1/0059* (2013.01); *H04L 1/0071* (2013.01); *H04L 1/0073* (2013.01); *H04L 1/1671* (2013.01); *H04L 1/1692* (2013.01); *H04L 1/1812* (2013.01); *H04L 5/0007* (2013.01); *H04L 5/001* (2013.01); *H04L 2001/125* (2013.01); *H04L 5/0055* (2013.01); *H04L 5/0057* (2013.01)
USPC ....................................................... 714/748

(56) References Cited

U.S. PATENT DOCUMENTS

| | | | |
|---|---|---|---|
| 7,254,769 | B2 | 8/2007 | Kim et al. |
| 8,345,794 | B2 | 1/2013 | Xu et al. |
| 2002/0141433 | A1 | 10/2002 | Kwon et al. |
| 2003/0039217 | A1 | 2/2003 | Seo et al. |
| 2003/0108013 | A1 | 6/2003 | Hwang et al. |
| 2003/0133497 | A1 | 7/2003 | Kinjo et al. |
| 2003/0236071 | A1 | 12/2003 | Ito |
| 2004/0010743 | A1 | 1/2004 | Lee et al. |
| 2004/0268206 | A1 | 12/2004 | Kim et al. |
| 2005/0147159 | A1 | 7/2005 | Kadowaki |
| 2006/0015789 | A1 | 1/2006 | Shin et al. |
| 2006/0039409 | A1 | 2/2006 | Lampinen |
| 2006/0156184 | A1 | 7/2006 | Kim et al. |
| 2007/0047499 | A1 | 3/2007 | Montojo et al. |
| 2008/0146166 | A1 | 6/2008 | Khan et al. |
| 2008/0153425 | A1 | 6/2008 | Heo et al. |
| 2008/0165893 | A1 | 7/2008 | Malladi et al. |
| 2008/0310360 | A1 | 12/2008 | Heo et al. |
| 2008/0320373 | A1 | 12/2008 | Kim et al. |
| 2009/0154458 | A1 | 6/2009 | Kim et al. |
| 2009/0175248 | A1 | 7/2009 | Kim et al. |
| 2009/0296667 | A1 | 12/2009 | Tajima et al. |
| 2010/0046482 | A1 | 2/2010 | Sridhara et al. |
| 2010/0098012 | A1 | 4/2010 | Bala et al. |
| 2010/0135181 | A1 | 6/2010 | Earnshaw et al. |
| 2010/0157895 | A1 | 6/2010 | Pani et al. |
| 2010/0172433 | A1 | 7/2010 | Li et al. |
| 2010/0195662 | A1 | 8/2010 | Kang et al. |
| 2010/0246604 | A1 | 9/2010 | Kim et al. |
| 2010/0251061 | A1 | 9/2010 | Okamura et al. |
| 2010/0284362 | A1 | 11/2010 | Tajima et al. |
| 2011/0010598 | A1 | 1/2011 | Wang et al. |
| 2011/0149894 | A1 | 6/2011 | Luo et al. |
| 2011/0182277 | A1 | 7/2011 | Shapira |
| 2011/0205981 | A1 | 8/2011 | Koo et al. |
| 2011/0249578 | A1 | 10/2011 | Nayeb Nazar et al. |
| 2011/0268045 | A1 | 11/2011 | Heo et al. |
| 2011/0269490 | A1 | 11/2011 | Earnshaw et al. |
| 2011/0274059 | A1 | 11/2011 | Brown et al. |
| 2011/0286544 | A1 | 11/2011 | Avudainayagam et al. |
| 2012/0020434 | A1 | 1/2012 | Callard et al. |
| 2012/0033587 | A1 | 2/2012 | Papasakellariou et al. |
| 2012/0082075 | A1 | 4/2012 | Luo et al. |
| 2012/0099545 | A1 | 4/2012 | Han et al. |
| 2012/0113831 | A1 | 5/2012 | Pelletier et al. |
| 2012/0210187 | A1 | 8/2012 | Yin et al. |
| 2013/0116002 | A1 | 5/2013 | Kim et al. |

OTHER PUBLICATIONS

Blakenship, Yufei Wu, et al.; U.S. Appl. No. 13/649,911, filed Oct. 11, 2012; Title: Method and System for Up-Link HARQ-ACK and CSI Transmission.
3GPP TR 25.814 V7.0.0; 3rd Generation Partnership Project; Technical Specification Group Radio Access Network; Physical Layer Aspects for Evolved Universal Terrestrial Radio Access (UTRA); Release 7; Jun. 2006; 126 pages.
3GPP TS 36.212 V9.0.0; 3rd Generation Partnership Project; Technical Specification Group Radio Access Network; Evolved Universal Terrestrial Radio Access (E-UTRA); Multiplexing and Channel Coding; Release 9; Dec. 2009; 61 pages.
3GPP TS 36.213 V10.2.0; 3rd Generation Partnership Project; Technical Specification Group Radio Access Network; Evolved Universal Terrestrial Radio Access (E-UTRA); Physical Layer Procedures; Release 10; Jun. 2011; 120 pages.
3GPP TSG-RAN WG1 #66; "Periodic CSI and A/N Reporting for CA"; R1-112921; Zhuhai, China; Oct. 10-14, 2011; 3 pages.
3GPP TSG-RAN WG1 Meeting #66bis; "Multiplexing CSI and A/N Using PUCCH F3"; R1-113218; Zhuhai, China; Oct. 10-14, 2011; 9 pages.
3GPP TSG RAN WG1 Meeting #61; "A/N Codebook Design with DTX for Carrier Aggregation"; R1-103088; Montreal, Canada; May 10-14, 2010; 11 pages.
3GPP TSG-RAN WG1 #60bis; "On ACK/NACK Codebook Performance for Carrier Aggregation"; R1-101787; Beijing, China; Apr. 12-16, 2010; 19 pages.
3GPP TSG RAN WG1 Meeting #62; "Equalization of ACK/NAK Bit Performance in LTE-A"; R1-104314; Madrid, Spain; Aug. 23-27, 2010; 3 pages.
Office Action dated Sep. 26, 2013; U.S. Appl. No. 13/268,255, filed Oct. 7, 2011; 19 pages.
Notice of Allowance dated Mar. 6, 2014; U.S. Appl. No. 13/268,255, filed Oct. 7, 2011; 16 pages.
Office Action dated Aug. 1, 2013; U.S. Appl. No. 13/649,911, filed Oct. 11, 2012; 25 pages.
Office Action dated Jan. 13, 2014; U.S. Appl. No. 13/649,911, filed Oct. 11, 2012; 14 pages.
PCT International Search Report; Application No. PCT/US2012/059979; Feb. 8, 2013; 4 pages.
PCT Written Opinion of the International Searching Authority; Application No. PCT/US2012/059979; Feb. 8, 2013; 6 pages.
PCT International Search Report; Application No. PCT/US2010/052075; Jan. 19, 2011; 4 pages.
PCT Written Opinion of the International Searching Authority; Application No. PCT/US2010/052075; Jan. 19, 2011; 7 pages.
European Extended Search Report; Application No. 11184419.7; Nov. 30, 2011; 5 pages.
Kim, Joon Beom, et al.; U.S. Appl. No. 13/787,479, filed Mar. 6, 2013; Title: Method and System for Uplink HARQ and CSI Multiplexing for Carrier Aggregation.
3GPP TS 36.211 V10.1.0; 3rd Generation Partnership Project; Technical Specification Group Radio Access Network; Evolved Universal Terrestrial Radio Access (E-UTRA); Physical Channels and Modulation; Release 10; Mar. 2011; 104 pages.
3GPP TS 36.212 V10.1.0; 3rd Generation Partnership Project; Technical Specification Group Radio Access Network; Evolved Universal Terrestrial Radio Access (E-UTRA); Multiplexing and Channel Coding; Release 10; Mar. 2011; 77 pages.
3GPP TS 36.213 V10.1.0; 3rd Generation Partnership Project; Technical Specification Group Radio Access Network; Evolved Universal Terrestrial Radio Access (E-UTRA); Physical Layer Procedures; Release 10; Mar. 2011; 115 pages.
Divsalar, Dariush, et al.; "Coding Theorems for 'Turbo-Like' Codes"; Proc. 36th Allerton Conf. on Communication; Control and Computing; Allerton, Illinois; Sep. 1998; 10 pages.
Final Office Action dated May 8, 2014; U.S. Appl. No. 13/649,911, filed Oct. 11, 2012; 22 pages.
PCT International Search Report; Application No. PCT/US2013/029416; May 7, 2013; 5 pages.
PCT Written Opinion of the International Searching Authority; Application No. PCT/US2013/029416; May 7, 2013; 7 pages.
Office Action dated Aug. 28, 2014; U.S. Appl. No. 13/649,911, filed Oct. 11, 2012; 27 pages.
Notice of Allowance dated Jan. 14, 2015; U.S. Appl. No. 13/649,911, filed Oct. 11, 2012; 13 pages.
Office Action dated Dec. 5, 2014; U.S. Appl. No. 13/787,479, filed Mar. 6, 2013; 38 pages.

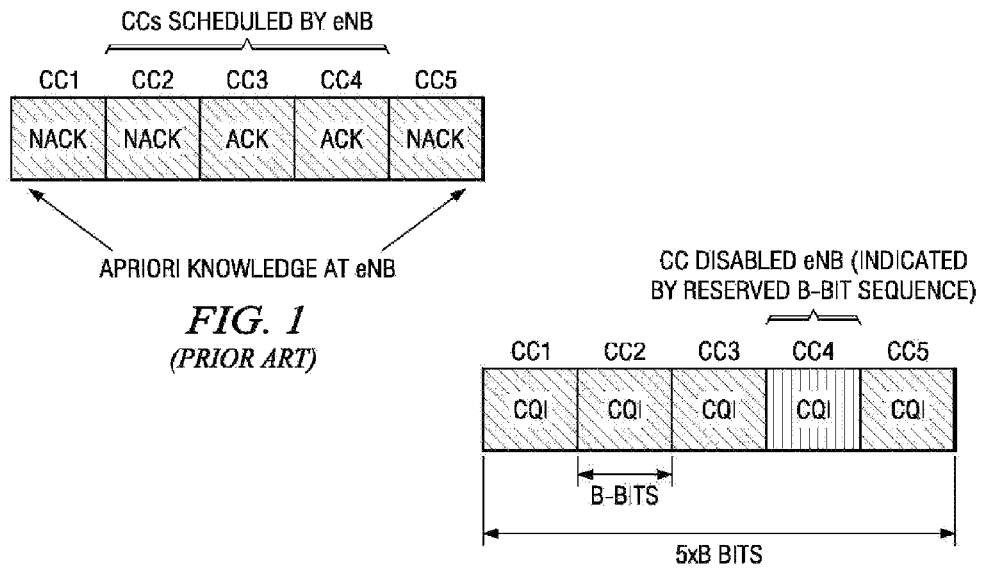
FIG. 1
(PRIOR ART)
FIG. 2
(PRIOR ART)
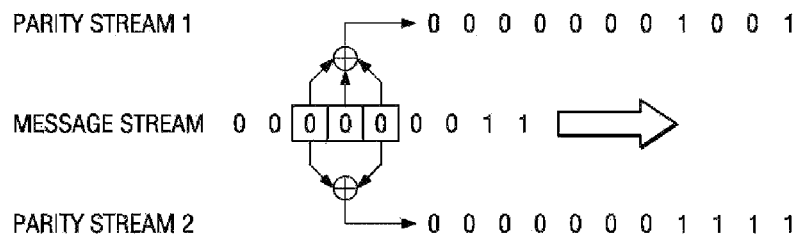
FIG. 3
(PRIOR ART)
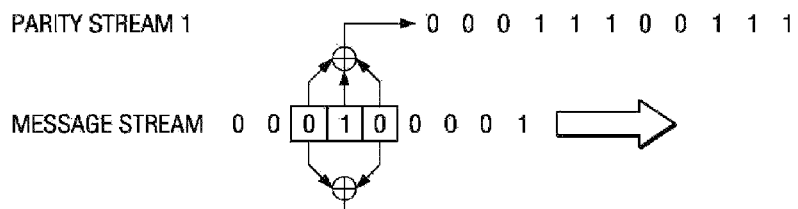
FIG. 4

|  | PAIRWISE DISTANCES WITHOUT REORDERING | | | |
|---|---|---|---|---|
|  | 00 | 01 | 10 | 11 |
| 00 | - | 5 | 5 | 6 |
| 01 | 5 | - | 6 | 4 |
| 10 | 5 | 6 | - | 4 |
| 11 | 6 | 4 | 4 | - |
|  |  |  |  |  |
|  | PAIRWISE DISTANCES WITH REORDERING | | | |
|  | 00 | 01 | 10 | 11 |
| 00 | - | 5 | 5 | 10 |
| 01 | 5 | - | 10 | 5 |
| 10 | 5 | 10 | - | 5 |
| 11 | 10 | 5 | 5 | - |
Figure 5
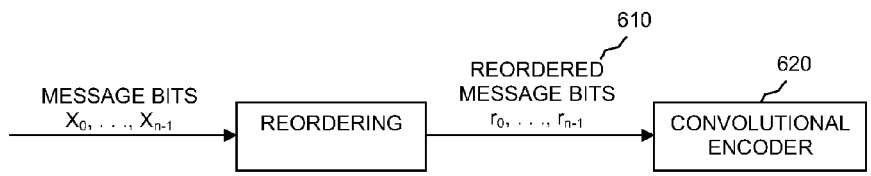
Figure 6
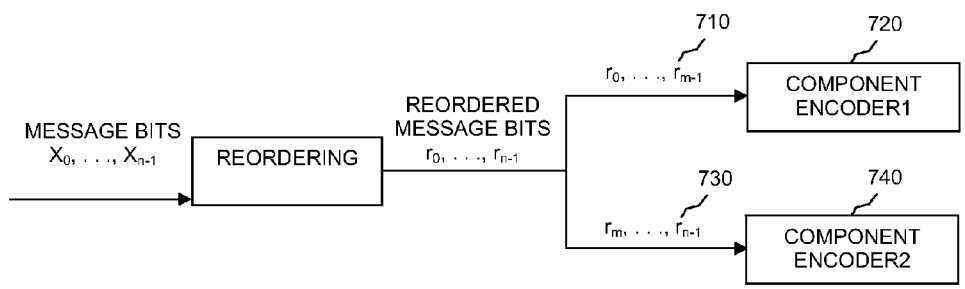
Figure 7

MESSAGE REARRANGEMENT FOR IMPROVED WIRELESS CODE PERFORMANCE

CROSS-REFERENCE TO RELATED APPLICATIONS

This application is a continuation of U.S. patent application Ser. No. 13/268,255 filed Oct. 7, 2011, entitled "Message Rearrangement For Improved Wireless Code Performance", which is a continuation of PCT Patent Application No. PCT/US2010/052075 filed Oct. 8, 2010, entitled "Message Rearrangement for Improved Code Performance", both of which are incorporated herein by reference as if reproduced in their entirety.

FIELD

The present disclosure generally relates to data transmission in mobile communications systems and more particularly to message rearrangement for improved code performance.

DESCRIPTION OF THE RELATED TECHNOLOGY

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. The term "E-UTRAN node B" can also be interchangeably referred to as "evolved node B" or "enhanced node B" in the context of this document. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B or Enhanced Node B), that can provide a user agent (UA) (alternatively referred to as user equipment (UE)) with access to other components in a telecommunications system.

In mobile communication systems such as an E-UTRAN, the access device provides radio accesses to one or more UAs. The access device comprises a packet scheduler for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for physical downlink shared channel (PDSCH) and physical uplink shared channel (PUSCH) data transmissions, and sends scheduling information to the UAs through a control channel. The UAs refer to the scheduling information for the timing, frequency, data block size, modulation and coding of uplink and downlink transmissions.

In many wireless communications systems, both the transmitter and receiver assume no apriori (i.e., presupposed by experience) knowledge on the message bits. However, in certain cases apriori knowledge of message bits does exist and can be taken advantage of by the decoder. Examples of such cases include an acknowledgement/negative acknowledgement (ACK/NACK) transmission and channel quality information (CQI) transmission in Carrier Aggregation (CA) in the Long Term Evolution-Advanced (LTE-A) system.

In the LTE-A system, communication is temporally divided into subframes of 1 ms duration in which bidirectional communication between the UE and eNB may occur on one or more component carriers (CCs). Additionally, the ratio of downlink to uplink subframes may vary up to a ratio of 4:1 according to traffic needs in the case of Time Division Duplex (TDD).

Prior to a data transmission on the Physical Downlink Shared CHannel (PDSCH) in a subframe, the eNB encodes control information on the Physical Downlink Control Channel (PDCCH) and transmits in a control region (which may have a length of up to four orthogonal frequency division multiplexing (OFDM) symbols in the beginning of the subframe). A UE attempts PDCCH decoding at the beginning of each subframe. Once a UE detects a PDCCH scheduled to itself, the UE performs PDSCH decoding of the same subframe according to the scheduling information included in a detected PDCCH. If a cyclic redundancy check (CRC) check of the PDSCH data is successful, the UE transmits ACK on the Physical Uplink Control Channel (PUCCH) four subframes after PDSCH reception. If the CRC check of PDSCH data is not successful, the UE transmits NACK on PUCCH to request a retransmission. Typically if no PDCCH is detected for 3GPP Release-8 (i.e. a single downlink carrier) then no acknowledgement (either positive or negative) is indicated in the uplink PUCCH; this is referred to as discontinuous transmission (DTX).

In carrier aggregation, a UE may receive on a multiple of up to five downlink component carriers (DL CCs) depending on the UE's capabilities and deployment scenario. Multiple PDSCHs can be scheduled to one UE in the same subframe and multiple PDSCHs may be decoded in parallel. However, to save the UE battery power, it has been agreed that the UE may transmit multiple ACK/NACKs for multiple PDSCHs on one PUCCH in the UL PCC (Primary Component Carrier). When multiple hybrid automatic repeat request acknowledgements (HARQ-ACKs) are transmitted on one PUCCH, one of the issues relating to the transmission is to define the information bit size (or number of information bits) in the PUCCH format. One method of defining the bit size is that the number of ACK/NACK bits is determined based on the number of PDCCHs that the UE detects. However, this method can cause a mismatch problem when the UE misses one of the PDCCHs and the eNB is not aware of that situation. If the number of ACK/NACK bits assumed in the eNB and the UE is different, the eNB will fail to correctly receive all of the ACK/NACK bits. Another method of defining the bit size is that the number of ACK/NACK bits is determined in a semi-static manner based on the number of configured CCs and the number of configured transport blocks (TBs) per configured CC. Since the number of configured CCs is signaled by RRC signaling and hence remains constant in a semi-static sense (i.e. does not change dynamically), the mismatch problem can be avoided or minimized. Alternatively, the number of CCs may be sufficient if a maximum number of TBs is used for all CCs. If less than this maximum number is needed in a CC for ACK/NACK signaling, then the remaining bits can be set to a fixed value. In a TDD system, ACK/NACK bits can be determined by the number of configured CCs, the number of configured TBs per configured CC and the number of downlink subframes to support the case when the ACK/NACKs of multiple DL subframes are multiplexed and transmitted in one UL subframe.

When the number of ACK/NACK bits is determined based on the number of configured CCs and number of configured transport blocks (TBs) per configured CC, if a PDCCH is received on at least one of the configured CCs, then NACKs are sent for all CCs for which no PDCCH has been detected. If a PDCCH is detected then the UE makes an attempt to receive the corresponding PDSCH data. If PDSCH decoding is successful, the UE sends an acknowledgement (ACK) message to the eNB; otherwise a negative acknowledgement (NACK) is indicated. In the case a CC is configured for dual-transport block multiple input multiple output (MIMO) transmission, two ACK/NACK bits per subframe are needed for that CC, whereas for a carrier configured for a single transport block only one ACK/NACK bit per subframe may be necessary.

Since the eNB knows in which CCs and subframes PDCCH and PDSCH transmissions did not occur, it has apriori knowledge that NACKs will be indicated for those resources provided at least one PDCCH and therefore one PDSCH was scheduled on at least one of the configured CCs. That is, the UE will signal NACKs for both a non-detection of a PDCCH and an unsuccessful PDSCH decoding when a PDCCH was detected. However, the eNB knows which CCs on which a PDCCH was transmitted and therefore knows that any ACK/NACK bits corresponding to CCs and subframes where a PDCCH was not transmitted must have a value of NACK.

An example is shown in FIG. 1, labeled Prior Art, for message size of 5 bits. It is assumed that the ratio of uplink to downlink subframes is 1:1 but that PDCCH/PDSCH transmissions can be scheduled on subframes of up to 5 CCs and that each CC is configured for one TB. In the example PDCCH/PDSCH transmissions are scheduled on CC2, CC3 and CC4 only. Therefore, during the decoding of this ACK/NACK message, the eNB can treat the ACK/NACK value on these component carriers as unknown while it can assume the values of CC1 and CC5 are known (i.e. the ACK/NACK feedback bits for CC1 and CC5 must necessarily have a value of NACK in this example).

A further example of transmissions containing apriori knowledge may be in the case of CQI multiplexing for carrier aggregation (CA) which may occur both in TDD and Frequency Division Duplexing (FDD). CQI is reported periodically for each CC; however, these periodic reports may overlap. One option under discussion in LTE-A for CA is to concatenate into one report several CQI reports from different CCs in the case of overlap. To have the same understanding of the CQI payload between the eNB and UE when the number of activated CCs is changed, it also has been proposed that all overlapping CQI reports be included in the message payload regardless of whether the CC corresponding to a CQI report is being activated or deactivated.

In the case where a CQI report from a deactivated CC is included in the overall CQI payload, the UE need not calculate the channel quality of the deactivated CCs because the CQI information of the deactivate CC is not required in the eNB. In this case the UE may transmit a known sequence in place of the deactivated CQI report. As shown in FIG. 2, labeled Prior Art, some of the CC CQI reports may be disabled and a known sequence can be included. One purpose of this known reserved sequence is to indicate that the CC of the corresponding CQI report has been deactivated in UE side. As soon as the eNB recognizes the known sequence, the eNB will understand any future CQI reports on the corresponding CC from the mobile during the reconfiguration period will also contain the known sequence and thus the eNB may treat the known sequence as apriori knowledge.

In evolved universal terrestrial radio access (EUTRA), when more than eleven payload bits exist for control information feedback (e.g. ACK/NACK bits or CQI feedback), either a tail-biting convolutional code or dual Reed-Muller code will be used rather than the single Reed-Muller block code used for payload sizes of less than or equal to eleven bits. With carrier aggregation for FDD, the maximum number of ACK/NACK bits that might need to be reported in 3GPP Release-10 is ten (five carriers, each carrier with two transport blocks) per downlink subframe. However, in a TDD system, the ACK/NACK information from multiple downlink subframes may need to be reported together within one uplink subframe (assuming a DL:UL subframe ratio up to 4:1), and hence it is quite possible that up to 40 ACK/NACK bits (5CC×2 TB×4 UL/DL ratio=40) may need to be reported in one uplink transmission (convolutional coding or dual Reed-Muller coding would be used in this instance). Future EUTRA releases may support more than five aggregated downlink carriers, which would similarly increase the total number of ACK/NACK bits being reported at one time even in FDD.

In addition, CQI information generally consists of several bits per carrier, and it is therefore likely that if CQI information from multiple downlink carriers is aggregated together that the total control information payload size will be greater than eleven bits, and hence convolutional coding or dual Reed-Muller coding could be used here as well, although convolutional coding is more likely in this case for ease of implementation.

Known coding techniques can be improved when apriori information is available. Such techniques include convolutional code and dual component codes such as dual Reed Muller codes. Known message bits can aid in decoding, but their positioning in message vector is closely tied to their utility. For an edge case, consider the situation in which only two bits in a message vector are not known apriori. The subcode formed by the codewords associated with the four possible messages may have better distance properties than the ambient code. Such an increase would provide greater error correction capabilities.

Consider the example shown in FIG. 3. Assume all of the zeros in the message are known to be zero at the receiver while the 1s are unknown ACK/NACK bits. Since the unknown bits are adjacent, these bits lead to a total convolutional codeword weight of 6, or 6 non-zero elements in total in the two convolutional code parity streams.

For a tail-biting convolutional code, such as the one used within E-UTRA, an important separation consideration is cyclical separation rather than strict linear separation. For example, an eight-bit binary sequence 10000001 has the two 1s separated by seven bit positions in a linear sense. However, in a cyclical sense (i.e. if this bit sequence is assumed to occur in a cyclic or circular form), then the first and last bits (which are both 1s) are actually considered to be adjacent. Consequently, the maximum cyclical bit separation that can be achieved for this example bit sequence is 10001000, where each of the 1s is four bit positions away from the other 1 in either direction.

The example shown in FIG. 3 raises a more general issue. Given a partition of a message into known and unknown bits, what class of permutations of the message bits induces a subcode with optimal distance properties? Furthermore, in the case message bits are structured in groups of blocks where each block of bits are either known or all unknown, is there a class of permutation that performs well regardless of which blocks are known or unknown?

Although the above analysis is for the case of ACK/NACK bits, similar arguments can also be used for the improved codeword performance in the case the transmitted message contains CQI information where at least one CQI report is disabled and consists of a known sequence (see FIG. 2). Here the known sequence should be used in some beneficial manner by the eNB.

SUMMARY

In accordance with the present invention, a method for permuting known and unknown message bits before encoding to provide a beneficial rearrangement of bits is set forth. Alternatively a method for reading message bits out of sequence to an encoder to provide a beneficial order of encoding bits is set forth. Such methods can improve distance properties in the resulting subcode. In various embodiments, the structure of a beneficial rearrangement is dependent on the parameters of how known and unknown bits are grouped and on the specific type of code being used. Given these two parameters, the message bits can be rearranged to more efficiently leverage any apriori knowledge.

In certain embodiments, two applications in which reordering bits are beneficial are set forth. More specifically, in a first application, reordering bits for ACK/NACK signaling is set forth and in a second application reordering bits for CQI signaling is set forth. The applications lend themselves to rearranging message bits containing apriori knowledge. Furthermore, in certain embodiments, the ACK/NACK application and CQI application use either a convolutional code or dual component encoding.

Also, although certain examples have been set forth with respect to message payloads comprising ACK/NACK information and CQI information, it will be appreciated that similar arguments can be used for improved codeword performance for message payloads in general containing apriori information.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 1, labeled Prior Art, shows an example of apriori knowledge in an ACK/NACK application.

FIG. 2, labeled Prior Art, shows an example of apriori knowledge in a CQI application.

FIG. 3, labeled Prior Art, shows a parity stream example.

FIG. 4, shows another parity stream example with separated unknown bit locations according to one embodiment.

FIG. 5, shows a table of pairwise distances between codewords according to one embodiment.

FIG. 6 shows a block diagram of a convolutional encoded reordered message block according to one embodiment.

FIG. 7 shows a block diagram of a dual component code encoded reordered message block according to another embodiment.

DETAILED DESCRIPTION

Figure 8:
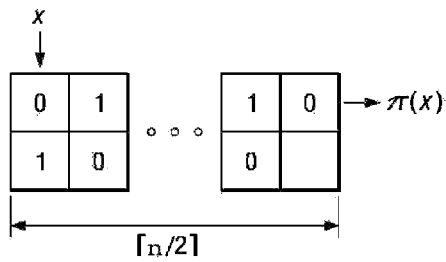
FIG. 8 shows a block diagram of a two-dimensional interleaver according to one embodiment.

The present invention generally relates to a system and method for permuting or reading out of sequence known and unknown message bits before encoding to provide a beneficial rearrangement of bits. The system and method can improve distance properties in the resulting subcode. More specifically, the structure of the beneficial rearrangement is dependent on the parameters of how known and unknown bits are grouped and on the specific type of code being used. Given these two parameters, the message bits can be rearranged to more efficiently leverage any apriori knowledge.

Although the rearrangement of the message bits is performed at the transmitter before encoding the receiver is also aware of the rearrangement used both to determine the position of the known bits to use as apriori knowledge during decoding and to correctly reconstruct the message after decoding.

In certain embodiments, the system and method are applied to two applications in which reordering bits are beneficial. More specifically, in a first application, reordering bits for ACK/NACK signaling is set forth and in a second application reordering bits for CQI signaling is set forth. The applications lend themselves to rearranging message bits containing apriori knowledge. Furthermore, in certain embodiments, the ACK/NACK application and CQI application use either a convolutional code or dual component encoding.

FIG. 4 shows how by separating the unknown bit locations, the convolutional codeword weight may be increased to 10 compared to a convolutional codeword weight of 6 in FIG. 3.

More specifically the pairwise hamming distance between each of the four possible convolutional codewords for each of the two ACK/NACK bit combinations is shown in the table of FIG. 5. These distances increase after reordering resulting in a more robust encoding structure.

FIG. 6 shows how in a convolutional code approach, the reordered message bits 610 can be provided directly to the convolutional encoder 620.

FIG. 7 shows how in the case where a dual component code is used, the first m reordered message bits (r0, . . . , rm−1) 710, may be encoded by a first component encoder 720 (or equivalently read sequentially to the first component encoder 720) while the remaining n-m reordered message bits (rm, . . . , rn−1) 730 may be encoded by a second component encoder 740 (or equivalently read sequentially to the second component encoder 740). In other words, when a dual component code is used, the reordered message bits can be separated into two portions. A first portion of the reordered message bits can be provided to a first encoder, and a second portion of the reordered message bits can be provided to a second encoder. An example component encoder may be the Reed Muller encoder.

More specifically, when applying the method to ACK/NACK signaling application, ACK/NACK message payload may be formed with either a single bit, which is associated with a CC, or with two bits, which are associated with a CC. These single or multiple bit formations correspond to where a CC is configured for single or dual transport block transmissions, respectively. All bits pertaining to a particular CC are generally either simultaneously known or unknown by the eNB. (That is, if no PDCCH is transmitted for a particular carrier, then either the single (single transport block carrier) or both (dual transport block carrier) ACK/NACK bits are known at the eNB to be equal to NACK). Ensuring the two ACK/NACK bits from a dual transport block carrier are separated after reordering aids in code performance when some of the total payload bits are known (or, in the more general case, separating the N ACK/NACK feedback bits from a carrier configured for N transport blocks). This separation (or equivalently reordering) can be accomplished in a variety of different ways.

When applying the method to the CQI application, the transmitted message contains CQI information and when at least one CQI report is deactivated and therefore contains at least one known reserved sequence, the known reserved sequence is used as an indicator of the UE's knowledge of CC reconfiguration to the eNB. This is the first step in being able to use the known reserved sequence as apriori knowledge.

After first detecting the known reserved sequence, the eNB may treat each subsequent transmission (until the CC is reactivated) of the known sequence (from each deactivated CQI report) as apriori knowledge during decoding. The method reorders the complete CQI message payload to improve code performance when at least one of the CQI reports in the message is known. If the CC is later reactivated by the eNB, then the eNB will no longer expect the known sequence to be used for the CQI report for the CC and will therefore not have any apriori knowledge for that CC during decoding.

It is desirable to increase the pairwise distance between bits from the same CQI report of a CC to maximize coding performance. This can be accomplished via a striping procedure.

There are a plurality of embodiments relating to the ACK/NACK application. In each of the ACK/NACK embodiments, ACK/NACK feedback for an arbitrary number of single transport block CCs (i.e. one ACK/NACK bit) and an arbitrary number of dual transport block CCs (i.e. two ACK/NACK bits) is considered. This ACK/NACK feedback may extend over multiple downlink subframes (e.g. in a TDD system with a DL:UL subframe ratio greater than 1:1), and hence multiple ACK/NACK feedback bits may exist for a particular carrier over multiple subframes. However, these can be considered as distinct ACK/NACK messages because scheduling of each subframe is performed independently. That is, each ACK/NACK message being considered includes between 1 and N bits, where N is the maximum number of transport blocks that may be transmitted on one downlink carrier in one subframe (N=2 for LTE-A).

More specifically, in certain embodiments relating to the ACK/NACK application, an even-odd striping operation is performed. With the even-odd striping operation, the operation lets x be the vector of length n formed by concatenating any arrangement of single- and dual-per CC ACK/NACK messages. The operation further defines a permutation as follows: list all even-indexed bits followed by all odd-indexed bits. For instance, the vector, x, (012345678) maps to (024681357). This permutation necessarily (cyclically) separates all adjacent bits by at least $$\left\lceil \frac{n-1}{2} \right\rceil$$

bits. Since all paired dual transport block ACK/NACK bits are necessarily adjacent, this separation is (cyclically) optimal. Furthermore, the permutation's effectiveness does not depend on the length of x. In a more general case of N transport blocks per CC, this solution may be extended to Mod-N striping. The operation further defines a permutation as follows: list all index bits that satisfy i mod N=0 first, and then list all index bits that satisfy i mod N=1 second and so on up to i mod (N)=N–1.

In other embodiments relating to the ACK/NACK application, a two-dimensional interleaver operation is performed. With the two-dimensional interleaver operation, the operation considers the two-dimensional interleaver shown in FIG. 8. The operation further lets the message bits be a vector x of size n. Message bits enter column-wise. After the message has been entirely entered, the interleaved version is read off row-wise. Since all paired dual transport block ACK/NACK bits are necessarily adjacent, this separation is (cyclically) optimal. This operation is similar to the even-odd operation but may require the use of dummy variables during the interleaving operation if the message length is odd.

In the case of two transport blocks per CC, the first row corresponds to even bits in the original message and the second row corresponds to odd bits in the original message. In a more general case of N transport blocks per CC, this operation can be extended to an interleaver of N rows and n/N columns.

While references may be made herein to an interleaving operation or to an interleaver, it should be understood that similar concepts could apply to a deinterleaving operation or to a deinterleaver.

In other embodiments relating to ACK/NACK application, a binary representation reversal operation is performed. With the binary representation reversal operation, the operation lets be the vector x of length $2^{\lceil log_2 n \rceil}$ formed by concatenating a total number n of any numbers of single- and dual-transport block ACK/NACK message bits and of length $2^{\lceil log_2 n \rceil} - n$ dummy bits (if n is not an exact integral power of 2). Let $x_i$ be the $i^{th}$ bit of x, $i \in \{0, 1, 2, \ldots, 2^{\lceil log_2 n \rceil} - 1\}$ and let $(b_1, b_2, \ldots, b_k)$, $k = \lceil log_2 n \rceil$, be the binary representation of the index i where each $b_j$ value represents a single bit position in the binary representation of i. The operation defines a permutation in the following way:

$$\pi x(b_1, b_2, \ldots, b_k) \to x(b_k, \ldots, b_1).$$

For instance, with n=16, a permutation is $\pi(x_5) = \pi(x_{(0101)}) = x_{(1010)} = x_{10}$. A benefit of this approach is that it is easily implementable in hardware. A disadvantage of this approach is it may require the inclusion of dummy bits during the binary representation reversal operation if n does not happen to be an exact integral power of two.

In other embodiments relating the ACK/NACK application, a turbo encoder interleaving operation is performed. With the turbo encoder interleaving operation, a turbo code interleaver (such as that defined in Section 5.1.3.2.3 of 3GPP TS 36.212 V9.0.0) is defined as: $\pi(i) = (f_1 i + f_2 i^2)$ modulo K, where $f_1$ and $f_2$ are parameters chosen based on the block size K. However, in the turbo code interleaver defined by Section 5.1.3.2.3 of 3GPP TS 36.212 V9.0.0, $f_1$ and $f_2$ are only specified for values of greater than or equal to 40. Thus new values for 10<K<40 are defined by the present turbo encoder interleaving operation.

Novelty of this solution includes its application to reordering message bits before encoding. Furthermore, the reordering may result in a random like reordering rather than a structured reordering. A random reordering of bits with apriori knowledge may not maximize code performance; however, it would at least result in improved code performance as compared to no reordering.

In other embodiments relating to the ACK/NACK application, a separate second bit operation is performed. With the separate second bit operation, the operation lets x be the vector of length n formed by concatenating any numbers of single- and dual-transport block ACK/NACK messages. The operation further permutes x using the following iterative construction: reading left to right along x, remove the second bit from each dual-transport block ACK/NACK, shift the remaining bits to the left, and sequentially replace the removed bit(s) to the right-most positions of x. This operation effectively separates dual-transport block ACK/NACKs in most cases, and is equivalent to even-odd striping operation in the case where all bits correspond to dual-transport block ACK/NACKs.

In other embodiments relating to the ACK/NACK application, a separate first-TB, single-TB and second-TB bit operation is performed. The separate first-TB, single-TB and second-TB bit operation is a variation of the separate second bit operation. With the separate first-TB, single-TB and second-TB bit operation, the operation lets x be the vector of length n formed by concatenating any numbers of single- and dual-transport block ACK/NACK messages. The operation further permutes x using a rearrangement of ACK/NACK bits with an order of the first ACK/NACK bits of all dual-transport block carriers, ACK/NACK bits of all single-transport block carriers, and, second ACK/NACK bits of all dual-transport block carriers.

Within each group of single or dual transport block carriers, the carriers are arranged into a predetermined order which is known at both the UE and eNB (e.g. ascending frequency, ascending Carrier Indicator Field (CIF) (if CIF values are unique per carrier), also ordered by subframe). This operation achieves maximum non-cyclical separation of the ACK/NACK bits for dual transport block carriers.

To achieve maximum cyclical separation of the ACK/NACK bits for dual transport block carriers, a rearrangement of ACK/NACK bits may be used, where there are N1TB single transport block carriers (note that N1TB may equal zero if all carriers are configured as dual transport block carriers). More specifically the rearrangement has an order of first ACK/NACK bits of all dual-transport block carriers, ACK/NACK bits of the first $\lceil N_{1TB}/2 \rceil$ single-transport block carriers, second ACK/NACK bits of all dual-transport block carriers, and ACK/NACK bits of the last $\lfloor N_{1TB}/2 \rfloor$ single-transport block carriers.

Figure 10:
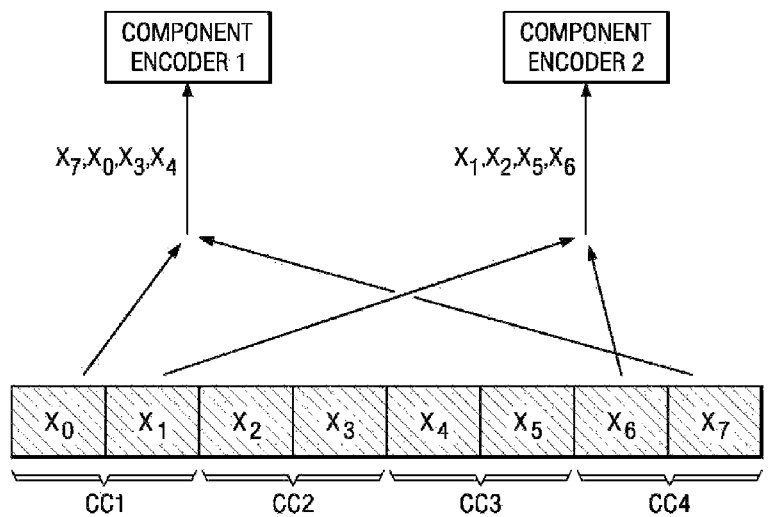
FIG. 10 shows a block diagram of a dual component code with message bits being read out of sequence to encoders according to one embodiment.
Figure 11:
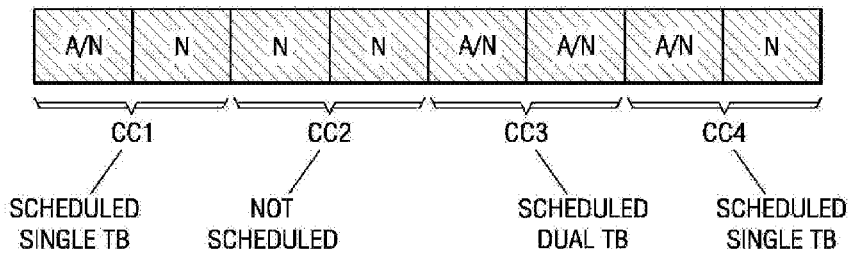
FIG. 11 shows an example of apriori knowledge in an ACK/NACK application according to one embodiment.
Figure 12:
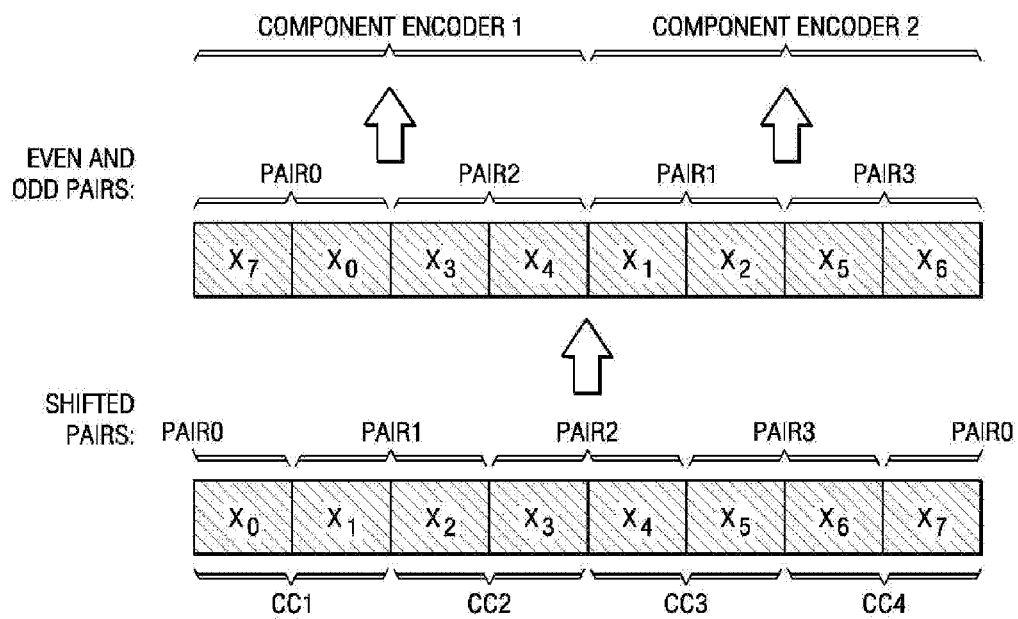
FIG. 12, shows an example reordering of message bits before encoding with a dual component encoder according to one embodiment.

In other embodiments relating to the ACK/NACK application, pairs of ACK/NACK bits are transmitted per component carrier. If a scheduled component carrier supports two transport blocks then both ACK/NACK bits are used. Otherwise if a scheduled carrier supports the transmission of only a single transport block then only the first bit carries the ACK/NACK information while the second bit is fixed as a NACK. As before, if a component carrier is not scheduled then NACKs are transmitted for that component carrier. Examples of these three cases are shown in FIG. 11 for CC1, CC2, CC3 and CC4. Shifted pairs of elements can be constructed from this message as shown in FIG. 12. In the case the encoder is a dual component encoder such as a dual Reed Muller encoder, the even pairs could be read directly to the first encoder and the odd pairs read directly to the second also shown in FIG. 12. This could be implemented by non-sequential reading of message bits to each encoder as shown in FIG. 10.

While the disclosed operations have concentrated on the case where is composed of blocks of size 1 or 2, there exist direct analogues of many of these schemes for other non-homogeneous collections of blocks.

There are a plurality of embodiments relating to the CQI application. More specifically, when the transmitted message contains CQI information and at least one CQI report is deactivated and includes a known reserved sequence, the known reserved sequence can be used as an indicator of the UE's knowledge of CC reconfiguration to the eNB. This operation is the first step in being able to use the known reserved sequence as apriori knowledge.

On recognizing the transmission of each indicator, the eNB may thereafter treat each known sequence (from each deactivated CQI report) as apriori knowledge during decoding. The resulting code performance can be further enhanced through reordering of the message bits prior to encoding.

More specifically, in certain embodiments relating to the CQI application, a striped reordering operation is performed. With the striped reordering operation, the operation lets b the channel CQI block size and c be the total number CQI reports. If x is the vector formed by concatenating the CQI reports and $x_k$ is the $k^{th}$ component (bit) of x where $0 \leq k < b*c$, the operation defines $\pi: x_{ib+j} \to x_{jc+i}$.

The original ordering of x, i=0, 1, ..., c−1 is the channel number and j=0, ..., b−1 is the component number within a given CQI report. Then π stripes x, (i.e., in π(x) the zeroth components of every CQI report appear sequentially, followed by the first components of every CQI report, and so on). Adjacent bits from any CQI report are separated by exactly b bits. This pairwise separation is maximal.

This operation provides a good chance for increased minimum distance in the induced subcode. Also, this operation can be generalized to the case where a message consists of the concatenation of c blocks all of the bits in a block either being known or unknown.

In this operation, all CQI reports are of equal size whereas in the following operation the individual CQI reports may be of unequal size (indeed, in the ACK/NACK solutions in the previous section the per CC ACK/NACK were also of unequal size, that is 1 bit per CC and/or 2 bits per CC).

In other embodiments relating to CQI application, a block interleaving operation is performed. With the block interleaving operation, the operation lets bi be the channel CQI block size for the ith CQI report and c be the total number of CQI reports. CQI message bits are read column-wise into a two-dimensional interleaver of depth c rows and width c columns.

If the CQI block size is different for each CC, $b_{min}$ can be the size of the smallest CQI payload and c can be $$C = \left\lceil \frac{N_{total}}{b_{min}} \right\rceil$$

(or c=ceil($N_{total}/b_{min}$) where ceil is the ceiling or round up function), where $N_{total}$ is the total number of CQI bits. In this case dummy bits can be used to fill the interleaver before reading out the interleaved version row-wise. Alternatively, bmin can be defined with the size of CQI of a certain CC, be define with the size of biggest CQI payload, predetermined with a fixed value or configured by higher layers.

Figure 9:
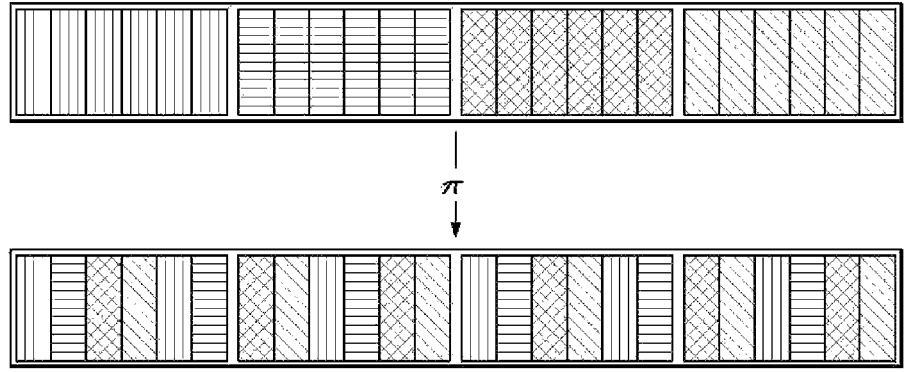
FIG. 9 shows an example of permutations according to one embodiment.

The operation further lets the message bits be a vector x of size n. After the message has been entirely entered, the interleaved version is read off row-wise and any dummy bits are removed. FIG. 9 shows an example of the permutation of π in this operation.

Figure 13:
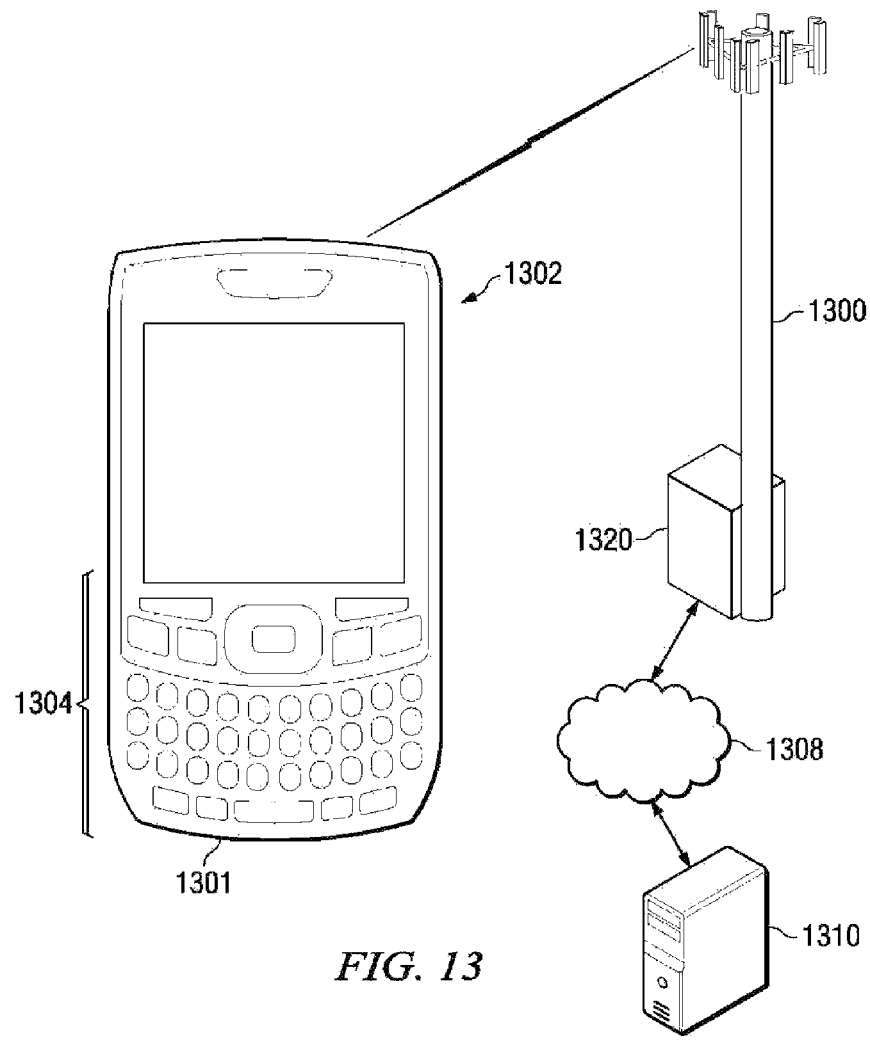
FIG. 13 shows a diagram of a wireless communications system including a UE operable for some of the various embodiments of the disclosure.

FIG. 13 illustrates a wireless communications system including an embodiment of user agent (UA) 1301. UA 1301 is operable for implementing aspects of the disclosure, but the disclosure should not be limited to these implementations. Though illustrated as a mobile phone, the UA 1301 may take various forms including a wireless handset, a pager, a personal digital assistant (PDA), a portable computer, a tablet computer, a laptop computer. Many suitable devices combine some or all of these functions. In some embodiments of the disclosure, the UA 1301 is not a general purpose computing device like a portable, laptop or tablet computer, but rather is a special-purpose communications device such as a mobile phone, a wireless handset, a pager, a PDA, or a telecommunications device installed in a vehicle. The UA 1301 may also be a device, include a device, or be included in a device that has similar capabilities but that is not transportable, such as a desktop computer, a set-top box, or a network node. The UA 1301 may support specialized activities such as gaming, inventory control, job control, and/or task management functions, and so on.

The UA 1301 includes a display 1302. The UA 1301 also includes a touch-sensitive surface, a keyboard or other input keys generally referred as 1304 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 1301 may present options for the user to select, controls for the user to actuate, and/or cursors or other indicators for the user to direct.

The UA 1301 may further accept data entry from the user, including numbers to dial or various parameter values for configuring the operation of the UA 1301. The UA 1301 may further execute one or more software or firmware applications in response to user commands. These applications may configure the UA 1301 to perform various customized functions in response to user interaction. Additionally, the UA 1301 may be programmed and/or configured over-the-air, for example from a wireless base station, a wireless access point, or a peer UA 1301.

Among the various applications executable by the UA 1301 are a web browser, which enables the display 1302 to show a web page. The web page may be obtained via wireless communications with a wireless network access node, a cell tower, a peer UA 1301, or any other wireless communication network or system 1300. The network 1300, which includes a base station 1320 (which may be a Node B or eNB type base station), is coupled to a wired network 1308, such as the Internet. Via the wireless link and the wired network, the UA 1301 has access to information on various servers, such as a server 1310. The server 1310 may provide content that may be shown on the display 1302. Alternately, the UA 1301 may access the network 1300 through a peer UA 1301 acting as an intermediary, in a relay type or hop type of connection.

Figure 14:
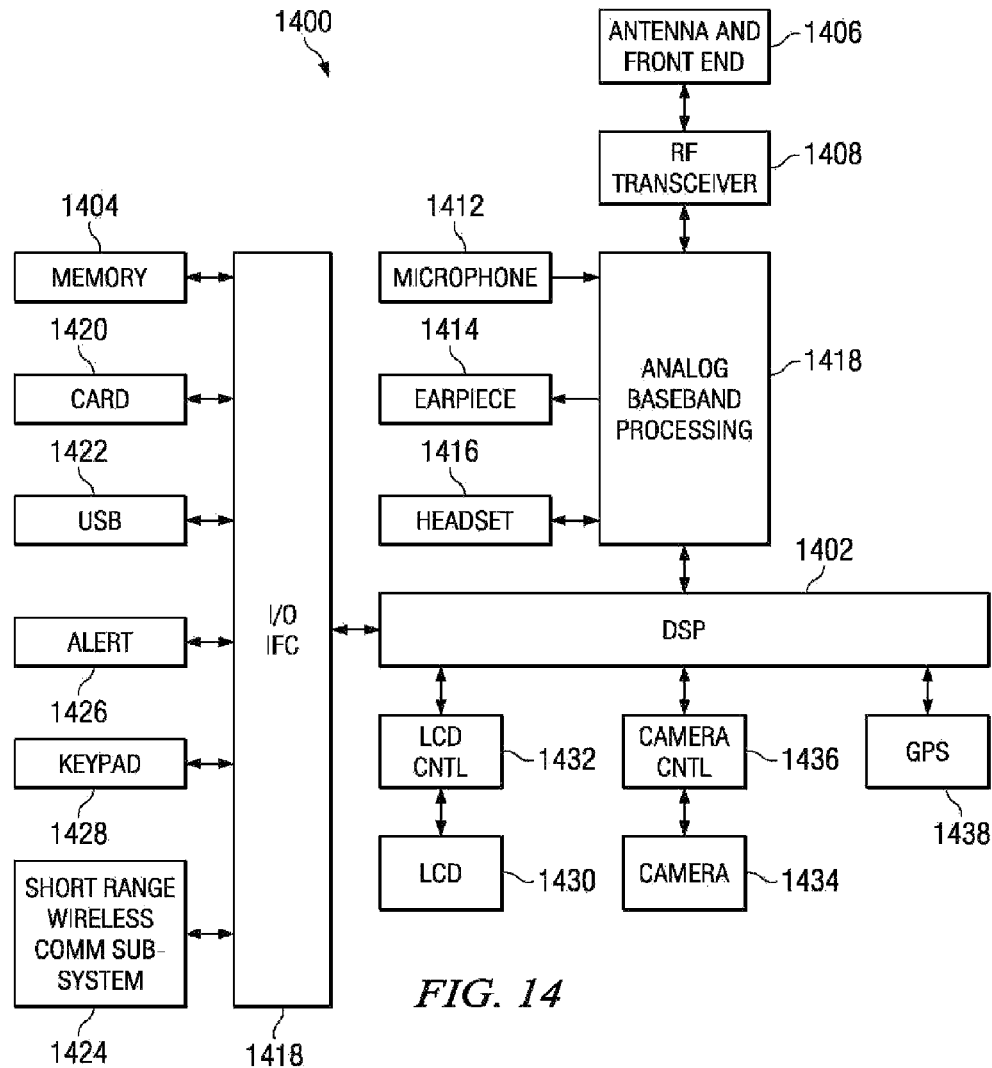
FIG. 14 shows a block diagram of a UE operable for some of the various embodiments of the disclosure.

FIG. 14 shows a block diagram of the UA 1301. While a variety of known components of UAs 1301 are depicted, in an embodiment a subset of the listed components and/or additional components not listed may be included in the UA 1301. The UA 1301 includes a digital signal processor (DSP) 1402 and a memory 1404. As shown, the UA 1301 may further include an antenna and front end unit 1406, a radio frequency (RF) transceiver 1408, an analog baseband processing unit 1410, a microphone 1412, an earpiece speaker 1414, a headset port 1416, an input/output interface 1418, a removable memory card 1420, a universal serial bus (USB) port 1422, a short range wireless communication sub-system 1424, an alert 1426, a keypad 1428, a liquid crystal display (LCD), which may include a touch sensitive surface 1430, an LCD controller 1432, a charge-coupled device (CCD) camera 1434, a camera controller 1436, and a global positioning system (GPS) sensor 1438. In an embodiment, the UA 1301 may include another kind of display that does not provide a touch sensitive screen. In an embodiment, the DSP 1402 may communicate directly with the memory 1404 without passing through the input/output interface 1418.

The DSP 1402 or some other form of controller or central processing unit operates to control the various components of the UA 1301 in accordance with embedded software or firmware stored in memory 1404 or stored in memory contained within the DSP 1402 itself. In addition to the embedded software or firmware, the DSP 1402 may execute other applications stored in the memory 1404 or made available via information carrier media such as portable data storage media like the removable memory card 1420 or via wired or wireless network communications. The application software may comprise a compiled set of machine-readable instructions that configure the DSP 1402 to provide the desired functionality, or the application software may be high-level software instructions to be processed by an interpreter or compiler to indirectly configure the DSP 1402.

The antenna and front end unit 1406 may be provided to convert between wireless signals and electrical signals, enabling the UA 1301 to send and receive information from a cellular network or some other available wireless communications network or from a peer UA 1301. In an embodiment, the antenna and front end unit 1406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 1406 may include antenna tuning and/or impedance matching components, RF power amplifiers, and/or low noise amplifiers.

The RF transceiver 1408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1410 and/or the DSP 1402 or other central processing unit. In some embodiments, the RF Transceiver 1408, portions of the Antenna and Front End 1406, and the analog base band processing unit 1410 may be combined in one or more processing units and/or application specific integrated circuits (ASICs).

The analog baseband processing unit 1410 may provide various analog processing of inputs and outputs, for example analog processing of inputs from the microphone 1412 and the headset 1416 and outputs to the earpiece 1414 and the headset 1416. To that end, the analog baseband processing unit 1410 may have ports for connecting to the built-in microphone 1412 and the earpiece speaker 1414 that enable the UA 1301 to be used as a cell phone. The analog baseband processing unit 1410 may further include a port for connecting to a headset or other hands-free microphone and speaker configuration. The analog baseband processing unit 1410 may provide digital-to-analog conversion in one signal direction and analog-to-digital conversion in the opposing signal direction. In some embodiments, at least some of the functionality of the analog baseband processing unit 1410 may be provided by digital processing components, for example by the DSP 1402 or by other central processing units.

The DSP 1402 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1402 may perform modulation, coding, interleaving, and spreading, and for a receiver function the DSP 1402 may perform despreading, deinterleaving, decoding, and demodulation. In another embodiment, for example in an orthogonal frequency division multiplex access (OFDMA) technology application, for the transmitter function the DSP 1402 may perform modulation, coding, interleaving, inverse fast Fourier transforming, and cyclic prefix appending, and for a receiver function the DSP 1402 may perform cyclic prefix removal, fast Fourier transforming, deinterleaving, decoding, and demodulation. In other wireless technology applications, yet other signal processing functions and combinations of signal processing functions may be performed by the DSP 1402.

The DSP 1402 may communicate with a wireless network via the analog baseband processing unit 1410. In some embodiments, the communication may provide Internet connectivity, enabling a user to gain access to content on the Internet and to send and receive e-mail or text messages. The input/output interface 1418 interconnects the DSP 1402 and various memories and interfaces. The memory 1404 and the removable memory card 1420 may provide software and data to configure the operation of the DSP 1402. Among the interfaces may be the USB interface 1422 and the short range wireless communication sub-system 1424. The USB interface 1422 may be used to charge the UA 1301 and may also enable the UA 1301 to function as a peripheral device to exchange information with a personal computer or other computer system. The short range wireless communication sub-system 1424 may include an infrared port, a Bluetooth interface, an IEEE 1102.11 compliant wireless interface, or any other short range wireless communication sub-system, which may enable the UA 1301 to communicate wirelessly with other nearby mobile devices and/or wireless base stations.

The input/output interface 1418 may further connect the DSP 1402 to the alert 1426 that, when triggered, causes the UA 1301 to provide a notice to the user, for example, by ringing, playing a melody, or vibrating. The alert 1426 may serve as a mechanism for alerting the user to any of various events such as an incoming call, a new text message, and an appointment reminder by silently vibrating, or by playing a specific pre-assigned melody for a particular caller.

The keypad 1428 couples to the DSP 1402 via the interface 1418 to provide one mechanism for the user to make selections, enter information, and otherwise provide input to the UA 1301. The keyboard 1428 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 1430, which may include touch screen capability and also display text and/or graphics to the user. The LCD controller 1432 couples the DSP 1402 to the LCD 1430.

The CCD camera 1434, if equipped, enables the UA 1301 to take digital pictures. The DSP 1402 communicates with the CCD camera 1434 via the camera controller 1436. In another embodiment, a camera operating according to a technology other than Charge Coupled Device cameras may be employed. The GPS sensor 1438 is coupled to the DSP 1402 to decode global positioning system signals, thereby enabling the UA 1301 to determine its position. Various other peripherals may also be included to provide additional functions, e.g., radio and television reception.

Figure 15:
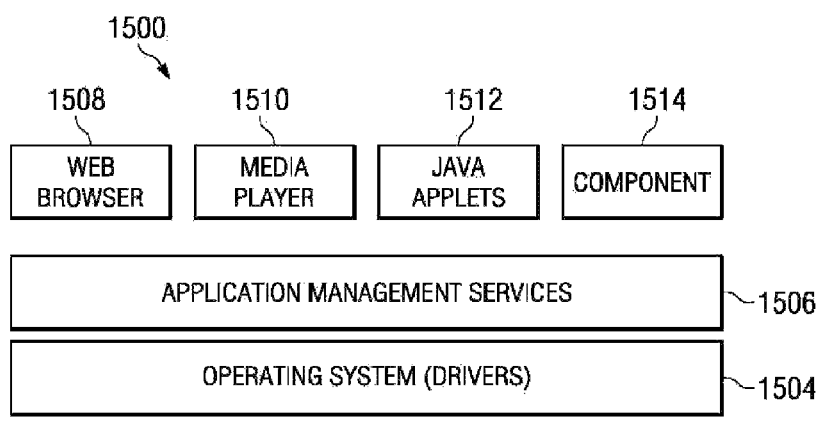
FIG. 15 shows a diagram of a software environment that may be implemented on a UE operable for some of the various embodiments of the disclosure.

FIG. 15 illustrates a software environment 1500 that may be implemented by the DSP 1402. The DSP 1402 executes operating system drivers 1504 that provide a platform from which the rest of the software operates. The operating system drivers 1504 provide drivers for the UA hardware with standardized interfaces that are accessible to application software. The operating system drivers 1504 include application management services (AMS) 1506 that transfer control between applications running on the UA 1301. Also shown in FIG. 15 are a web browser application 1508, a media player application 1510, and Java applets 1512. The web browser application 1508 configures the UA 1301 to operate as a web browser, allowing a user to enter information into forms and select links to retrieve and view web pages. The media player application 1510 configures the UA 1301 to retrieve and play audio or audiovisual media. The Java applets 1512 configure the UA 1301 to provide games, utilities, and other functionality. A component 1514 might provide functionality described herein.

Figure 16:
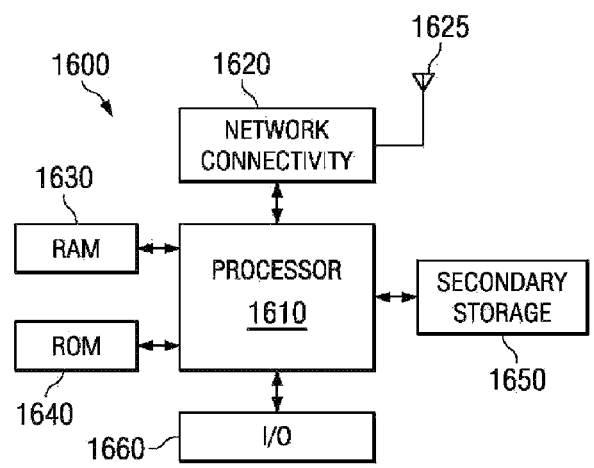
FIG. 16 shows a block diagram of an illustrative general purpose computer system suitable for some of the various embodiments of the disclosure.

The UA 1301, base station 1320 (including Node B and eNB type base stations), and other components described above might include a processing component that is capable of executing instructions related to the actions described above. FIG. 16 illustrates an example of a system 1600 that includes a processing component 1610 suitable for implementing one or more embodiments disclosed herein. In addition to the processor 1610 (which may be referred to as a central processor unit (CPU or DSP), the system 1600 might include network connectivity devices 1620, random access memory (RAM) 1630, read only memory (ROM) 1640, secondary storage 1650, and input/output (I/O) devices 1660. In some cases, some of these components may not be present or may be combined in various combinations with one another or with other components not shown. These components might be located in a single physical entity or in more than one physical entity. Any actions described herein as being taken by the processor 1610 might be taken by the processor 1610 alone or by the processor 1610 in conjunction with one or more components shown or not shown in the drawing.

The processor 1610 executes instructions, codes, computer programs, or scripts that it might access from the network connectivity devices 1620, RAM 1630, ROM 1640, or secondary storage 1650 (which might include various disk-based systems such as hard disk, floppy disk, or optical disk). While only one processor 1610 is shown, multiple processors may be present. Thus, while instructions may be discussed as being executed by a processor, the instructions may be executed simultaneously, serially, or otherwise by one or multiple processors. The processor 1610 may be implemented as one or more CPU chips.

The network connectivity devices 1620 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1620 may enable the processor 1610 to communicate with the Internet or one or more telecommunications networks or other networks from which the processor 1610 might receive information or to which the processor 1610 might output information.

The network connectivity devices 1620 might also include one or more transceiver components 1625 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1625 might include separate receiving and transmitting units or a single transceiver. Information transmitted or received by the transceiver 1625 may include data that has been processed by the processor 1610 or instructions that are to be executed by processor 1610. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1630 might be used to store volatile data and perhaps to store instructions that are executed by the processor 1610. The ROM 1640 is a non-volatile memory device that typically has a smaller memory capacity than the memory capacity of the secondary storage 1650. ROM 1640 might be used to store instructions and perhaps data that are read during execution of the instructions. Access to both RAM 1630 and ROM 1640 is typically faster than to secondary storage 1650. The secondary storage 1650 is typically comprised of one or more disk drives or tape drives and might be used for non-volatile storage of data or as an over-flow data storage device if RAM 1630 is not large enough to hold all working data. Secondary storage 1650 may be used to store programs that are loaded into RAM 1630 when such programs are selected for execution.

The I/O devices 1660 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1625 might be considered to be a component of the I/O devices 1660 instead of or in addition to being a component of the network connectivity devices 1620. Some or all of the I/O devices 1660 may be substantially similar to various components depicted in the previously described drawing of the UA 1301, such as the display 1302 and the input 1304.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A non-transitory computer medium storing computer readable instructions executable by a processor to implement a method comprising:
    rearranging, by a user equipment, a plurality of control information bits; and
    encoding, by the user equipment, the rearranged control information bits, using a dual component encoding operation.

2. The non-transitory computer medium of claim 1, wherein rearranging the plurality of control information bits comprises rearranging the plurality of control information bits, based upon at least one grouping of the information bits.

3. The non-transitory computer medium of claim 2, wherein the grouping of the information bits comprises a number of consecutive control information bits corresponding to a carrier.

4. The non-transitory computer medium of claim 1, wherein the control information bits are indicative of an acknowledgement/negative acknowledgement (ACK/NACK) of hybrid automatic repeat request (HARQ).

5. The non-transitory computer medium of claim 1, wherein the control information bits are indicative of channel quality information (CQI).

6. The non-transitory computer medium of claim 1, wherein the dual component encoding operation comprises a Reed Muller encoding operation.

7. The non-transitory computer medium of claim 1, wherein rearranging the plurality of control information bits comprises separating adjacent bits of the control information bits.

8. The non-transitory computer medium of claim 1, wherein the dual component encoding operation comprises producing a first sequential code portion by using a first component encoder and producing a second sequential code portion by using a second component encoder.

9. A base station configured to:
    decode, using a dual component decoding operation, a plurality of control information bits transmitted from a user equipment; and
    rearrange the decoded control information bits.

10. The base station of claim 9, wherein the base station rearranges the decoded control information bits based upon at least one grouping of the information bits.

11. The base station of claim 9, wherein the control information bits are indicative of an acknowledgement/negative acknowledgement (ACK/NACK) of hybrid automatic repeat request (HARQ).

12. The base station of claim 9, wherein the dual component decoding operation comprises a Reed Muller decoding operation.

13. The base station of claim 9, wherein the dual component decoding operation comprises producing a first sequential decoded portion by using a first component decoder and producing a second sequential decoded portion by using a second component decoder.

14. A non-transitory computer medium storing computer readable instructions executable by a processor to implement a method comprising:
    decoding, by a base station, a plurality of control information bits transmitted from a user equipment, using a dual component decoding operation; and
    rearranging, by the base station, the decoded control information bits.

15. The non-transitory computer medium of claim 14, wherein rearranging the decoded control information bits comprises rearranging the decoded control information bits, based upon at least one grouping of the information bits.

16. The non-transitory computer medium of claim 14, wherein the control information bits are indicative of an acknowledgement/negative acknowledgement (ACK/NACK) of hybrid automatic repeat request (HARQ).

17. The non-transitory computer medium of claim 14, wherein the dual component decoding operation comprises a Reed Muller decoding operation.

18. The non-transitory computer medium of claim 14, wherein the dual component decoding operation comprises producing a first sequential decoded portion by using a first component decoder and producing a second sequential decoded portion by using a second component decoder.

19. A user equipment configured to:
    rearrange a plurality of control information bits; and
    encode the rearranged control information bits using a dual component encoding operation, wherein the dual component encoding operation comprises producing a first sequential code portion by using a first component encoder and producing a second sequential code portion by using a second component encoder.

20. The user equipment of claim 19, wherein the user equipment is configured to rearrange the plurality of control information bits, based upon at least one grouping of the information bits.

21. The user equipment of claim 19, wherein the control information bits are indicative of an acknowledgement/negative acknowledgement (ACK/NACK) of hybrid automatic repeat request (HARQ).

22. The user equipment of claim 19, wherein the dual component encoding operation comprises a Reed Muller based encoding operation.

23. The user equipment of claim 19, wherein the user equipment is configured to rearrange the plurality of control information bits by interleaving even indexed bits and odd indexed bits of the control information bits.

* * * * *